United States Patent [19]
Gibbs et al.

[11] 4,121,167
[45] Oct. 17, 1978

[54] AMPLIFYING CHARACTERISTICS OF A CAVITY-ENCLOSED NONLINEAR MEDIUM

[75] Inventors: Hyatt McDonald Gibbs, Warren; Samuel Leverte McCall, Jr., Gillette; Thirumalai Nallan Chakravarthy Venkatesan, Plainfield, all of N.J.

[73] Assignee: Bell Telephone Laboratories, Incorporated, Murray Hill, N.J.

[21] Appl. No.: 735,989

[22] Filed: Oct. 27, 1976

[51] Int. Cl.² .............................................. H01S 3/00
[52] U.S. Cl. .................................. 330/4.3; 332/7.51; 307/88.3
[58] Field of Search ....................... 330/4.3; 332/7.51; 331/94.5 C; 307/88.3

[56] References Cited
U.S. PATENT DOCUMENTS

| | | | |
|---|---|---|---|
| 3,610,731 | 10/1971 | Seidel | 350/160 |
| 3,813,605 | 5/1974 | Szoke | 330/4.3 |

OTHER PUBLICATIONS

Akhmanor et al., "Parametric Generation In a Resonator Filled With a Nonlinear Medium," 12/65, pp. 1841-1849, Radio Engineering and Electronic Physics.
Akuda et al., "Saturable Optical Resonators . . . Reflectors," 10/76, pp. 138-142, Optics Communications, vol. 19, #1.
Felben et al., "Nonlinear Optical Reflection and Transmission . . . ," 5/76, pp. 1176-1180, Phys. Rev. Lett., vol. 36, #20.

*Primary Examiner*—Nelson Moskowitz
*Attorney, Agent, or Firm*—Peter V. D. Wilde

[57] ABSTRACT

A device is disclosed which is capable of amplifying optical signals. The absorptive and dispersive properties of a cavity-enclosed nonlinear medium are combined with the transmission properties of the cavity to yield an input-output characteristic curve that displays gain or bistability.

66 Claims, 10 Drawing Figures

AMPLIFYING CHARACTERISTICS OF A CAVITY-ENCLOSED NONLINEAR MEDIUM

BACKGROUND OF THE INVENTION

1. Field of the Invention

This invention is a device that amplifies optical signals without any intermediate transformation of the optical signal into an electronic signal. In the device the characteristics of a nonlinear medium are controlled in such a way that when combined with the transmission characteristics of the cavity, amplification of the optical signal results.

2. Background of the Prior Art

The development of the laser has influenced many areas of technology and in some has provided for devices far beyond the ken of the original pioneers in this field. So, for example, the laser has established a significant role in fields as diverse as medicine, civil engineering, semiconductor device fabrication, various manufacturing processes and of course general research and development. One major application, predicted by early workers in the field of laser technology, is still in a period of dynamic growth. This application involves the use of lasers in the field of communication. Although the obvious advantages of such an application in terms of greater bandwidth are widely recognized, problems of transmission and signal processing are formidable. In the field of transmission the development of optical fibers appears to have been a significant step along the road to effective transmission of optical signals. In the area of signal processing, some direct processing of optical signals through the use of nonlinear materials has been realized, and solid-state lasers will, in all probability, be useful as miniature light sources in future communications systems. However, the ultimate step to completely integrated optical circuitry has yet to be fully realized. Such integrated optics, comparable in scale and function to integrated electronic circuitry, would enable the engineer to work with optical signals in much the same way as one works with electrical signals today. Transformation of the optical signal to an electronic signal would occur only at the extreme terminals of the communication system, if at all. All amplifying and switching operations would occur with the signal in its optical form without intermediate electronic devices. The realization of completely integrated optical circuitry has been delayed for lack of a viable optical amplifier -- a device akin to a transistor but which would not require any intermediate electronic devices. This application discloses such an optical amplifier.

3. Description of the Prior Art

The inventive device utilizes the transmission characteristics of a nonlinear medium. These characteristics have been found by applicants to be controllable in such a way that a region of amplification is obtained.

Specific characteristics of nonlinear absorbers have long been known. Generally, light impinging on a linear absorptive medium will diminish in strength as it passes through the medium according to the formula $$I_L = I_0 e^{-\beta L} \qquad (1)$$

Here $I_0$ is the initial beam intensity, $I_L$ is the intensity at any distance $L$ in the medium and $\beta$ is the absorption coefficient embodying the absorption characteristics of the medium. $\beta$ is a known function of the impinging beam wavelength, for a given medium, and displays large increases in the region of ground state transitions. So, for example, in the case of a gas the absorption is very strong at a wavelength that connects one of the ground states with an excited state.

Despite the strong absorption of the impinging beam in the region of a transition, it has been found that as the beam intensity is increased a region is found where the absorbed energy approaches a maximum. This occurs when the intensity of the beam is sufficiently high to "excite" approximately half of the atoms to the upper state. At equilibrium this is the largest number of atoms allowed in the upper state at any given time. Under these circumstances any additional light impinging on the gas will not be absorbed. The medium is then said to be bleached or saturated. It has been previously shown that the transmission characteristics of a resonant optical cavity may be significantly altered when filled with such a saturable absorber. A simple heuristic argument will serve to demonstrate this fact.

An empty resonant optical cavity consists of two plane mirrors of high reflectivity placed at a distance L from one another. When light of intensity $I_0$ impinges perpendicularly on one mirror an amount $I_0T$ is transmitted into the cavity. Here T is the transmission of the appropriate mirror and is generally less than one. Once inside the cavity the light is reflected back and forth between the mirrors, some light being transmitted through the mirrors on each pass. If the distance between the mirrors is a multiple of one-half of the optical wavelength, then the cavity is said to be in resonance with the light, which light is then transmitted with little loss. This transmission is due to constructive interference of the light associated with each of the passes at the mirror surfaces. When this condition obtains, the intensity within the cavity is approximately $$I_C = I_T/T \qquad (2)$$

Here $I_C$ is the intracavity intensity and $I_T$ is the transmitted intensity. Since at resonance $$I_T \simeq I_0 \qquad (3)$$

we obtain $$I_C = I_0/T > I_0. \qquad (4)$$

The light intensity within the cavity is greater than that incident on the cavity of the multiple intracavity reflections.

Now consider the cavity to be filled with a saturable absorber which saturates when irradiated with light of intensity $I_S$. When light of intensity $I_0$ impinges at right angles to one of the plates of the cavity the intensity transmitted into the cavity, $$I_{TC} = I_0T, \qquad (5)$$

decays exponentially with distance according to equation 1. As a result of this decay very little energy reaches the second mirror and efficient multiple reflections do not occur. If, however, the power transmitted into the cavity, $I_{TC}$, is equal to $I_S$ $$I_{TC} = I_S \qquad (6)$$

then the power entering the cavity is sufficiently high to saturate the absorber and any additional light will pass through the medium as though it were not there. Under these conditions, the cavity is said to be switched on. It is then clear from equations 5 and 6 that the incident intensity which will turn the cavity on is given by $$I_{0\ TURN\ ON} = I_S/T \tag{7}$$

Now consider that the cavity is turned on and that the incident intensity is lowered. We want to observe the intensity at which the cavity turns off. It is obvious from our prior discussion that the medium will cease to be transmitting when the internal cavity intensity goes below $I_S$. The internal cavity intensity, however, is given by equation 4

$$I_C = I_0/T.$$

The turn-off condition then becomes $$I_C = I_S = I_0/T \tag{8}$$

$$I_{0\ TURN\ OFF} = I_S T. \tag{9}$$

When the impinging intensity becomes less than $I_S T$ the cavity will turn off. While the above argument is only qualitative, comparing equation 7 with equation 9 demonstrates that, since T is less than 1, the incident intensity at which the cavity turns on is greater than the intensity at which the cavity turns off. Consequently, while the power within the cavity may be related in a single valued way to the transmitted power, the relationship between the input power and the cavity power, and hence that between input and output power is dual valued.

This bistability was first disclosed by H. Seidel in U.S. Pat. No. 3,610,731 and was applied by A. Szoke in U.S. Pat. No. 3,813,605 to the production of short optical pulses with variable lengths. Szoke also describes in his disclosure applications similar to square wave amplification, inversion, and triggering. However, there is no indication in the prior art that this device can be operated in other than an absorptive bistable mode. Applicants have discovered that under certain operating conditions a primarily dispersive bistable device is realized. Since applicants' bistable device is primarily dispersive it displays significantly less loss than the absorptive bistable device. The instant applicants have also determined that under certain operating conditions the region of bistability degenerates into a single valued relationship with differential gain. A new device for amplifying light signals is then realized. This device arises from an improved understanding of the transmission characteristic of a resonant cavity filled with a nonlinear medium. The essential elements of this improved model are described below.

THE INVENTION

Brief Description of the Invention

The invention is a device for amplifying optical signals without the intervention of electronic amplifiers. Applicants have discovered that the absorptive and dispersive characteristics of a nonlinear medium can be combined with the transmission characteristics of a resonant cavity to yield an input-output characteristic curve which displays gain. In addition, the medium and cavity characteristics can be combined to yield a region of primarily dispersive bistability.

BRIEF DESCRIPTION OF THE DRAWINGS

The invention is described in detail below with reference to the following drawings.

DETAILED DESCRIPTION OF THE INVENTION

Figure 1:
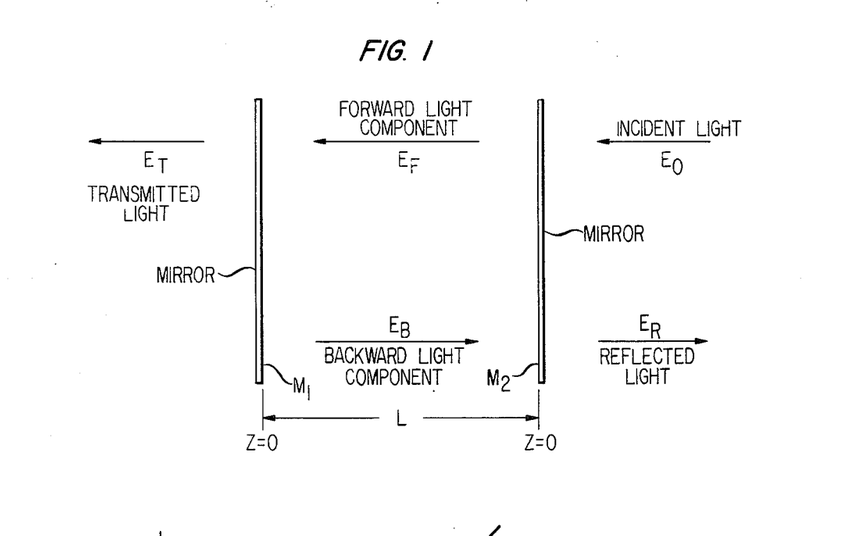
FIG. 1 is a schematic representation of an optical cavity.

Consider an empty cavity, as shown in FIG. 1, consisting of the two reflecting surfaces $M_1$ and $M_2$ each of transmission T and reflectively R, and separated by a distance L. While the reflecting surfaces can be mirrors or gratings, we refer to them as mirrors. We consider the mirrors to be lossless and hence R and T sum to unity. The cavity is resonant for light of wavelength $\lambda$ incident at an angle of 90° when $$L = m\lambda/2 + k \tag{10}$$

where m is an integer, and k is a constant that depends on the material nature of the mirrors. In all of the following discussion the cavity may be a Fabry-Perot cavity. $E_0$ is the input field associated with the incident light, $E_R$ is the reflected field outside the cavity, $E_T$ is the transmitted field, and $E_F$ and $E_B$ are the forward and backward field within the cavity respectively. Then from the definition of transmission and reflectivity we have at $Z = 0$ $$E_T = \sqrt{T} E_F \tag{11}$$

$$E_B = \sqrt{R} E_F. \tag{12}$$

At $Z = L$ the following condition applies $$\begin{pmatrix} E_F(o) \\ E_R \end{pmatrix} = \begin{pmatrix} \sqrt{T} & \sqrt{R}e^{i\Phi} \\ -\sqrt{R}e^{-i\Phi} & \sqrt{T} \end{pmatrix} \begin{pmatrix} E_o \\ E_B(o) \end{pmatrix} \tag{13}$$

Here $e^{i\Phi}$ is a phase factor attributed to the traversal of the waves associated with the electromagnetic fields through the cavity.

$$\Phi = (L/\lambda) 4\pi \ (MODULO \ 2\pi) \tag{14}$$

Since initially we consider the cavity empty the intracavity fields are not diminished during their traversal of the cavity.

We now proceed to calculate the input field $E_o$ in terms of the transmitted field $E_T$. From equation 13

$$E_F = \sqrt{T} E_o + \sqrt{R} e^{i\Phi} E_{B'} \tag{15}$$

Hence $$E_o = \frac{E_F - \sqrt{R} e^{i\Phi} E_B}{\sqrt{T}}. \tag{16}$$

However, from equations 11 and 12, at $Z = 0$ $$E_B = \sqrt{\frac{R}{T}} E_T. \tag{17}$$

Since there is no medium in the cavity $$E_B\Big|_{Z=L} = E_B\Big|_{Z=0} \tag{18}$$

and hence the value for $E_B$ derived in equation 17 may be substituted into equation 16. If, in addition, and with the same justification, we substitute the value of $E_F$ from equation 11 into equation 16 we obtain $$E_o = \frac{1 - Re^{i\Phi}}{T} E_T. \tag{19}$$

When the cavity is tuned to resonance $$e^{i\Phi} = 1 \tag{20}$$

and hence from equation 19 we get $$E_o = E_T \text{ (at resonance)}. \tag{21}$$

This is the simple resonant condition of 100 percent transmission and indicates the validity of our model.

Now consider the cavity to be filled with a nonlinear medium, for example a saturable absorber. For the purposes of this discussion we approximate the actual cavity conditions by assuming that the medium is optically thin and that absorption occurs only in $E_B$. The boundary conditions contained in equations 11, 12 and 13 are equally valid for the cavity containing an absorbing medium. Hence at $Z = L$ $$E_o(L) = \frac{E_F(o) - \sqrt{Re^{i\Phi}} E_B(o)}{\sqrt{T}}, \tag{22}$$

and from equations 2 and 3

$$E_F(o) = \frac{E_T}{\sqrt{T}} \tag{23}$$

$$E_B(o) = \sqrt{\frac{R}{T}} E_T$$

As a result of our approximation that the absorption within the cavity affects only $E_B$ we may write $$E_F(o) = E_F(L). \tag{24}$$

$E_B$ on the other hand is affected by the cavity medium, a condition which we express by $$E_B(L) = E_B(o) - G'\nu. \tag{25}$$

Here $G'\nu$ is the change in field due to its interaction with the medium and equation 25 describes the resultant diminution in $E_B$ as the associated wave traverses the cavity. Note that $G'\nu$ is itself dependent on the field amplitude. Combining equations 22-25 we obtain $$E_o = E_T\left(\frac{1 - Re^{i\Phi}}{T}\right) + Ge^{i\Phi}\nu \tag{26}$$

Here $$G = \frac{R}{T} G' \tag{27}$$

If in accordance with our assumption of an optically thin medium we write $$e^{i\Phi} \simeq 1 + i\Phi, \tag{28}$$

then we obtain from equation 26

$$E_o \simeq E_T - i\Phi R/T E_T + G\nu \tag{29}$$

where the second term on the right is retained in the lowest order approximation due to the generally large value of $R/T$. Equation 29 embodies the operative relationship between the light presented to the cavity and that transmitted by it. Although equation 29 relates to field amplitudes, the same qualitative relationship exists between the impinging and transmitted intensities. While we have considered only absorption, in general the $\nu$ that appears in equation 29 is complex and reflects both the dispersive and absorptive nature of the nonlinear medium. Further analysis of equation 29 will reveal both bistable and amplifying characteristics, either absorptive or primarily dispersive in origin.

Figure 2:
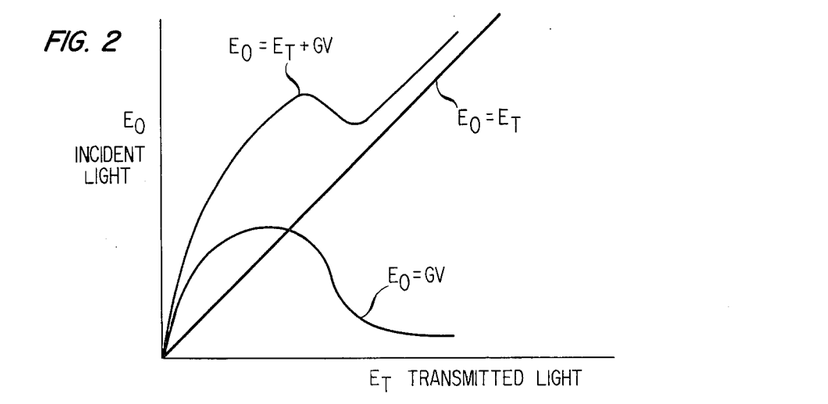
FIGS. 2 and 3 are graphical representations of the contributions of the various nonlinear phenomena to bistability.
Figure 3:
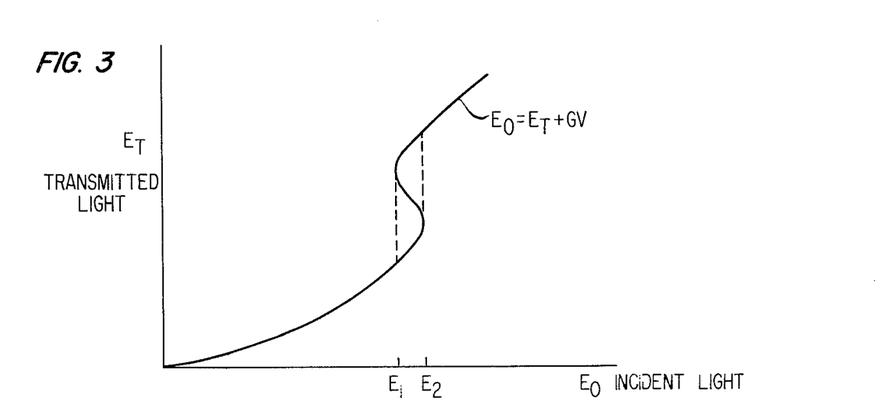
Figure 4:
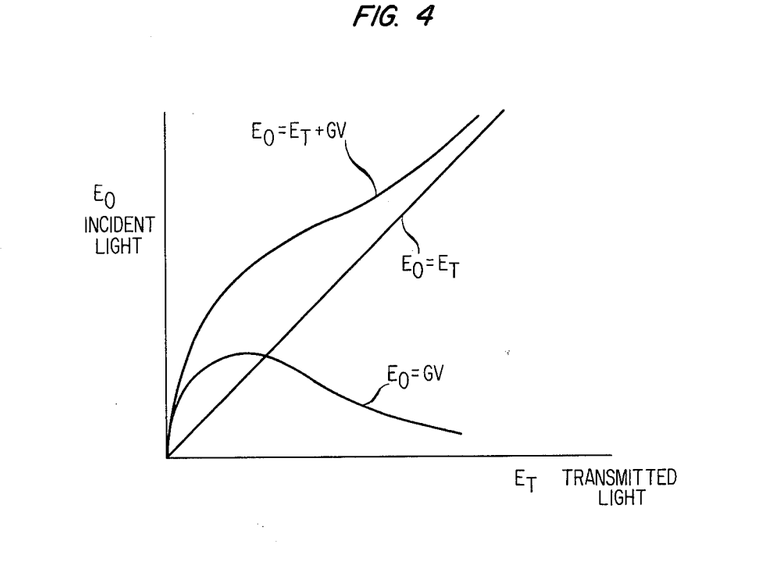
FIGS. 4 and 5 are graphical representations of the various nonlinear phenomena to single valued amplification.
Figure 5:
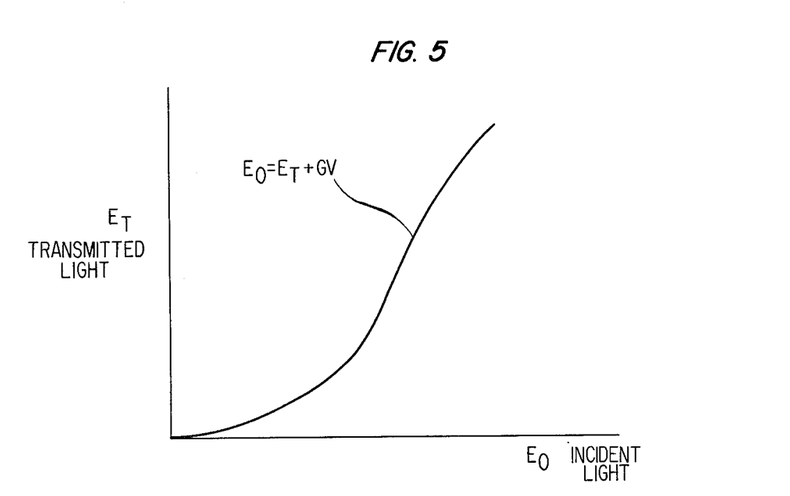

To simplify the discussion of equation 29 consider that $\nu$ is real and totally absorptive, and $\Phi = 0$. It is known that $\nu$ can be a function of intensity and hence of $E_o$. In FIG. 2, the general behavior of $G\nu$ is graphed on coordinates of $E_o$ versus $E_T$. Equation 29, neglecting the $\Phi$ term, is also displayed in this figure. In FIG. 3 equation 29 is displayed with the ordinate and abscissa interchanged. In the region between $E_1$ and $E_2$ the curve is multivalued and bistability results as described by Seidel and Szoke. However, as a direct result of the insights disclosed in this specification, it is apparent that $G\nu$ can be varied to alter the shape of the output curve. So, for example, in FIG. 4, $G\nu$ is varied so that the resultant output curve displayed in FIG. 5 is single valued and with a region of gain. It bears emphasizing that although these results are in terms of the electromagnetic fields, the same qualitative relationships exist between the various intensities. If $\Phi$ is nonzero, reflecting the fact that the cavity is detuned when empty, an additional term is available which one may vary to obtain amplifying characteristics in the output curve. Furthermore in general $\nu$ is complex and includes the dispersive qualities of the medium which may also be altered to control the output characteristics of the cavity. One necessary characteristic of this invention is that the nonlinear medium is a positive-temperature medium. A positive-temperature medium is one which lacks a population inversion of the kind necessary for laser action in the disclosed device.

Practice of the Invention

While the above equations are adequate for demonstrating the amplifying and bistable phenomena associated with a cavity-enclosed nonlinear medium, the practice of the invention would, in most instances include solving more accurate equations. Such equations are described in part in the article by S. L. McCall, Jr. which appeared in the April 1974 (Vol. 9, No. 4) issue of *The Physical Review* at page 1522. In this reference the more exact equations describing the intracavity fields are given by $$\frac{\delta E_F}{\delta Z} = \sigma(o) E_F + \sigma(2K) E_B \quad (30)$$
$$\frac{\delta E_B}{\delta Z} = -\sigma(o) E_B - \sigma(-2K) E_F.$$

These equations are obtained by solving Maxwell's equations subject to the constraints imposed by the nonlinear medium. The $\sigma$'s reflect the nonlinear characteristics of the medium. Unlike the equations in the above-referenced article, here the quantities in equation 30 must be considered complex in order to include both absorptive and dispersive phenomena.

In the practice of the invention equation 30 is combined with the boundary conditions dictated by the cavity and an expression is obtained for the transmitted intensity in terms of the incident intensity. This relationship which, in general, will not be analytical is given by $$I_T = F(I_o, M, C) \quad (31)$$

Here $F$ indicates a detailed functional relationship, $I_o$ and $I_T$ are the incident and transmitted intensities respectively, and are given by the absolute value of their associated fields squared, and M and C are medium and cavity dependent parameters respectively. The full solution represented by equation 31 is multidimensional and depends on the parameters $I_o$, M and C. However, according to the teachings and practice of this invention, there are particular values of these parameters for which equation 31 will be single valued and with a region of differential gain. The solution of the above equations according to these teachings will display regions of primarily absorptive or primarily dispersive gain, regions of combined absorptive and dispersive gain, and similar regions of bistability, all dependent on the range of parameters $I_o$, M and C. The solution of the appropriate equations and the determination and selection of the subset which would satisfy the requirements of this invention is obvious, in the light of this disclosure, to those skilled in the art.

This specification then discloses that, in addition to the previously disclosed bistable characteristics which rely on the purely absorptive properties of a nonlinear medium enclosed in a cavity, other significantly broader modes of operation are possible. Accordingly, bistability and amplification associated with both dispersive and absorptive characteristics of the medium can form the basis for new functional devices. The properties of the medium and the cavity may be altered to provide for bistable or single-valued-amplifying modes of operation, either absorptive or dispersive in origin, or a combination thereof. Properties which may be so varied include the density of the medium, its length, its temperature, impurity levels of the medium, the separation of the mirrors and their relative orientation, the orientation, polarization, intensity and frequency of the light entering the cavity, as well as the introduction of more than one beam of light into the cavity. It is apparent that the nature of the nonlinear medium whether gas, liquid, or solid is immaterial as long as it has properties of sufficient flexibility so that the requisite output characteristics obtain. In both absorptive and dispersive modes the empty cavity need not be tuned to resonance. The cavity may be formed of any material of adequate reflectivity. While the frequency may be anywhere in the electromagnetic spectrum depending on the medium, the invention will most likely be practiced in the optical region by which is meant the ultraviolet (500 Angstroms-4500 Angstroms) infrared (7500 Angstroms-25$\mu$) or visible (4500 Angstroms-7500 Angstroms).

Figure 6:
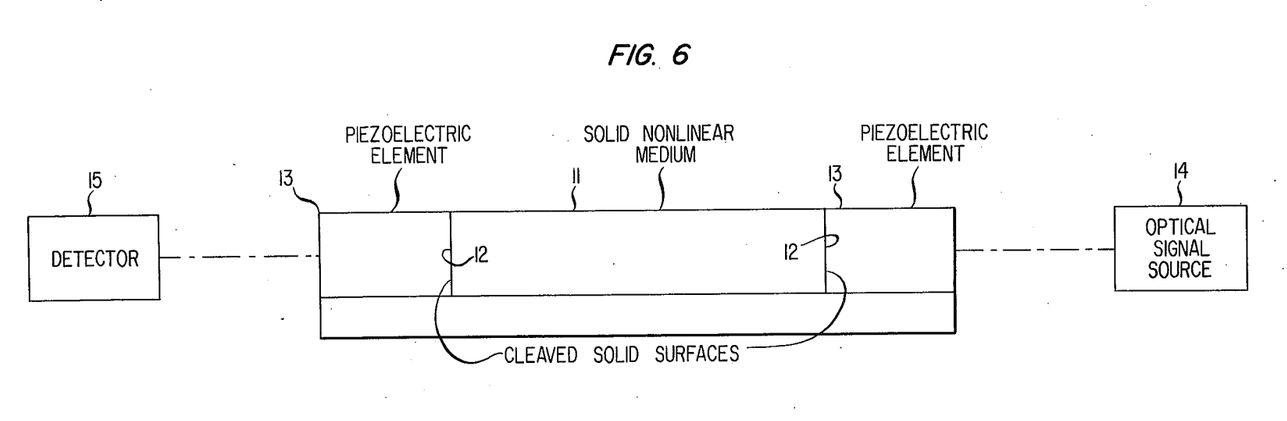
FIG. 6 is a representation of the device with a solid nonlinear medium.

The most practical embodiment of this invention will involve a solid nonlinear material, with cleaved ends to form reflecting surfaces and advantageously coated to increase reflectivity. For the dispersive devices representative materials are those with $|n_2| > 10^{-13}$ cm$^2$/stat-volt$^2$ where $n_2$ is the coefficient of the term in the field dependent refractive index which is quadratic in field. A device with a solid nonlinear medium is shown in FIG. 6. Here 11 is the solid nonlinear medium. The cleaved and coated ends are indicated by 12. One parameter that may be varied to fix the operating range is the medium length. Piezoelectric or electro-optic phenomena may be used for this purpose and such devices are represented by 13. The signal source is represented by 14 and the detector by 15.

Nonlinear semiconductor materials may be used as the solid medium. So, for example, InSb may be used for both dispersive amplification and bistability at an input wavelength of 10.8 microns. The operating range is controlled by altering its length or free carrier concentration. $N_2$ doped GaP maintained at reduced temperatures will display absorptive amplification. In either of these devices the cavity walls may be curved to increase the intracavity light density.

Once one has at one's disposal an optical amplifier of the type described above, one may perform many functions in direct analogy with the more familiar electronic amplifiers. These include but are not limited to simple a.c. amplification, clipping, limiting, discrimination and positive and negative feedback.

SPECIFIC EMBODIMENTS

Insignificant Dispersive Contributions Due to Nondriven States

Sodium

Figure 7:
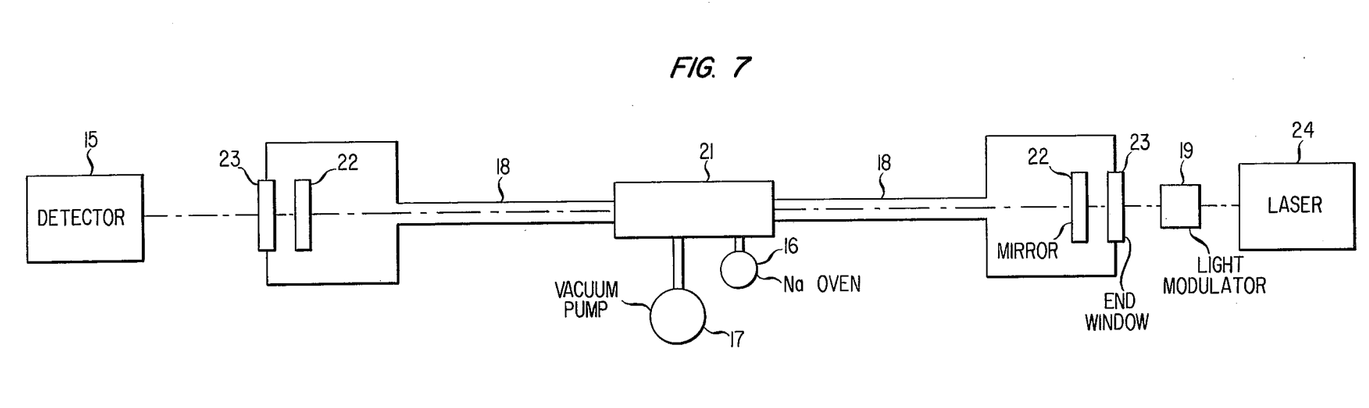
FIG. 7 is a schematic representation of a specific embodiment in which gaseous Na is the nonlinear medium.

For reasons of experimental expediency the first observations of optical bistability and differential gain were made with a Fabry-Perot interferometer (FP) containing sodium vapor and irradiated by the output of a frequency stabilized cw dye laser. This apparatus is shown in FIG. 7. The 50 mW single mode dye laser 24 was stabilized by locking it to an evacuated high-finesse FP (less than 100 MHz drift per hour). The dye laser was tuned by tilting and/or heating the 1 cm etalon. Absolute frequencies were determined by saturation spectroscopy. The optical beam traversed an acousto-optic modulator 19 which varied the intensity at audio frequencies, reduced the 10 percent dye laser amplitude jitter to 1 or 2 percent by feedback control, and eliminated optical feedback from the device to the dye laser by downshifting the return beam by 80 MHz. The optical beam incident on the optical amplifying device had a diameter of about 1.65 mm and a maximum power of 13 mW. The device consisted of a FP with 90 percent reflecting mirrors 22 joined with end windows 23 of an 11 cm long evacuated region. The central 2.5 cm length 21 contained Na vapor at a typical pressure of $10^{-5}$ to $10^{-4}$Torr. (Condensation of Na on the mirrors was impeded by 0.6 cm diameter, 4 cm long tubes with bellows 18 connecting the stainless steel Na cell to the mirrors). The transmitted and incident intensities were monitored by photomultiplier 15 and displayed as the vertical and horizontal deflections on an oscilloscope. The Na oven is represented by 16 and 17 represents the necessary vacuum apparatus.

At the time bistability was first seen we attributed it to nonlinear absorption, with the hysteresis upon lowering the intensity resulting from the large intracavity intensity keeping the absorption saturated for intensities below the turn-on intensity, as previously discussed. Although the Doppler effect in Na was expected to greatly reduce the bistability, the data indicated strong bistability. In further disagreement with the absorptive model, the characteristic curve changed differently when the FP plate separation was increased or decreased from optimum bistability separation. The FP asymmetry clearly indicated the importance of dispersion to optimum bistability in Na. By scanning the laser frequency across the $D_2$ line of Na, it was found that the asymmetry vanished and changed signs at three frequencies: about 400 MHz below the transitions from the ground state $F = 2$, at the crossover halfway between $F = 1$ and $F = 2$, and about 300 MHz above $F = 1$. It was then calculated that at these three frequencies the dispersion has no nonlinear properties. At the lowest frequency, purely absorptive bistable operation has been seen by using maximum power and high absorption. We believe that this constitutes the first clear demonstration of the previously predicated absorptive bistability. In other spectral regions combined absorptive and dispersive, or primarily dispersive, nonlinearity, bistability or gain could be observed depending on the medium density and the optical frequency. These conditions are summarized in Table I.

Table I

| Mode | Incident Freq. | Temp °C | Pressure (Torr) |
|---|---|---|---|
| Absorptive Bistability | $F = 2$, $-400$ MHz | $205 \pm 20$ | $2 \times 10^{-4}$ |
| Dispersive Bistability | $F = 2$, $+150$ MHz | $195 \pm 20$ | $10^{-4}$ |
| Absorptive Gain | $F = 2$, $-400$ MHz | $195 \pm 20$ | $10^{-4}$ |
| Dispersive Gain | $F = 1$, $-100$ MHz | $185 \pm 20$ | $6 \times 10^{-5}$ |

In column two F refers to the hyperfine line of the $D_2$ transition in Na at 5890 Angstroms. In the case of dispersive bistability the dispersion effect dominates.

Figure 8:
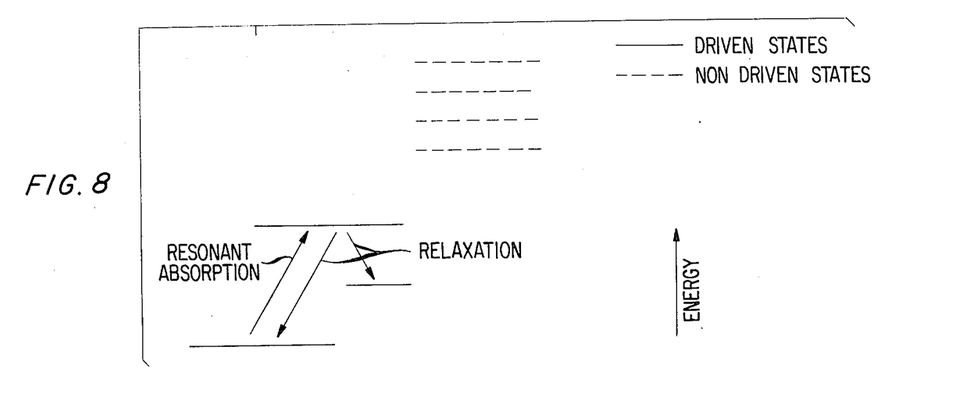
FIG. 8 is a schematic representation of the driven and nondriven states.

It should be understood that applicants have discovered that generally nonlinear dispersive (i.e., intensity dependent) effects that result in amplification or bistability may be associated with two distinct groups of quantum states. To illustrate these groupings consider a case where two or more states are driven by resonant or near resonant irradiating light, while the total dispersive effect due to the medium dominates the absorptive effect. The driven states (by which we mean those states whose polulation is directly altered by resonant absorption or resultant relaxation phenomena as illustrated in FIG. 8) make both absorptive and dispersive contributions to the overall interaction between the medium and the radiation. However, applicants have shown that additional dispersive contributions — even greater than 10 percent of the dispersive contribution due to the driven states — may be made by nondriven states. Consequently, absorptive phenomena which effect the population of the driven states yield not only the dispersive effects associated with the driven states but also yield significant dispersive effects associated with the nondriven states. In the case of sodium, the dispersive effects due to the nondriven states are small and certainly less than 10 percent of the dispersive effects due to the driven states. In the following examples, however, the dispersive effects associated with the nondriven states are significant and greater than 10 percent of the dispersive effect associated with the driven states.

Significant Dispersive Contributions Due to Nondriven States

Ruby

In the operational modes of interest in the following examples the dispersive characteristics of the medium — due to both the driven and nondriven states — dominate the absorptive characteristics of the medium. The relative contributions of the various dispersive and absorptive effects may take on different values, some of which are quite unexpected. For example, the absorptive contribution associated with the driven states may dominate the dispersive effects associated with the driven states, yet the dispersive contributions due to the nondriven states will result in the domination of the absorptive effect by the total dispersive effect. In all of the following examples the dispersive contributions of the nondriven states is at least 10 percent of the dispersive contributions of the driven states. Clearly, nondriven contributions of 50 percent or greater than 100 percent of the driven state contribution may even be more desirable. In each of these cases, the population of driven states introduces increased dispersive contributions due to the nondriven states. This allows for a situation in which the absorption associated with the driven states and hence the dispersion associated with the driven states is small. Yet, the total dispersive effect is large due to the contributions of nondriven states. The low absorption allows for low input power yet the large total dispersion yields effective bistable and amplifying characteristics.

In review, the nonlinear dispersive properties of the medium are made to dominate its nonlinear absorptive properties by inducing real transitions within the material through the absorption of light. The nonlinear dispersion associated with the driven states is enhanced by contributions from nondriven states. The resultant nonlinear dispersion associated with the medium dominates the absorptive effect and may combine with the cavity characteristics to yield the bistable and amplifying properties alluded to above. The absorption, while in and of itself contributing only minimally to the amplifying and bistable phenomena, causes a transition which results in large nonlinear dispersion. The resultant device displays either bistable or amplifying characteristics primarily because of the combination of the optical properties of the cavity and the dispersive, rather than the absorptive, properties of the medium. As in analogous electronic devices the gain characteristics of the amplifying device allows for operation, at times using more than one such device, in numerous modes; for example, a.c. amplification, clipping, limiting, descriminating, positive and negative feedback, oscillation, frequency multiplexing and demultiplexing and numerous logic modes.

In this example, ruby was used as the nonlinear medium. $Cr^{3+}$ ions may be elevated to the $2\bar{A}$ and $\bar{E}$ excited states by absorbing light of approximately 6934 Angstroms. If this system is considered as a simple two-state system, with the effects of other nondriven states consequently being neglected, then the nonlinear dispersion associated with the driven states is found to be very small at room temperature. Consequently, one would expect that the ruby device must be operated at very low temperatures in order to permit near resonant operation with a concomitant increase in the nonlinear dispersion associated with the driven states. However, applicants have found that the significant contribution of the nondriven states in this system to the nonlinear dispersion allows for room temperature operation of the ruby device in the dispersive mode. It should be noted that in nonlinear media generally the dispersive properties of the system are dependent on the population of the various states. The absorption of light changes the population of these various states thereby resulting in an intensity dependent or nonlinear dispersion. However, in this example and in the following example, the nonlinear dispersion is additionally affected in a very significant way by contributions from nondriven states.

Figure 9:
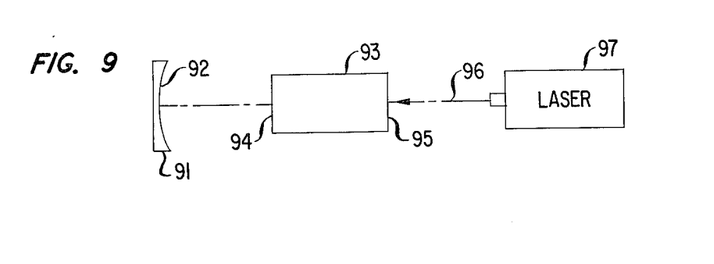
FIG. 9 is a schematic representation of a ruby device.

A schematic representation of the ruby device is shown in FIG. 9. In this figure, 91 is a quartz element with an associated spherical mirror surface 92 having approximately 90 percent reflectivity at 6934 Angstroms. 93 is a ruby element ½ cm thick and ¼ inch in diameter with a 91.5 percent reflecting surface 95 and a transmitting surface 94 with an antireflective coating. The radius of curvature of the spherical surface 92 is 0.87 cm. Light of approximately 6934 Angstroms wavelength respresented by 96 is introduced into the cavity. The laser source 97 includes an isolator. The light has a power density of greater than 100 watts/cm² and has a beam waist of 40 microns as it impinges on the ruby. The device has been operated in all modes with maximum input powers of between 150–600 watts/cm². The bistable and amplifying operation was obtained as shown in Table II. The transition from bistable to amplifying operation may be obtained in exemplary embodiments by varying the cavity temperature, the optical path length of the cavity, the concentration of chromium in the ruby, the crystal thickness, or the laser frequency or polarization or combinations thereof. A 5–20 msec. switching time was observed consistent with the 3–5 msec. excited state lifetime of the chromium ion in the ruby.

In the room temperature ruby device irradiated at 6934 Angstroms the dispersive contribution due to nondriven states exceeds the dispersive contribution due to the driven states. In fact if the irradiating light is adjusted so as to connect the ground state to a point between the $2\bar{A}$ and $\bar{E}$ excited states the dispersive contributions from these two driven states, being of different sign, will cancel. In such an event the only dispersive contribution is due to the nondriven states.

TABLE II

| Crystal | | Low Intensity Laser-Cavity | | | Ruby Laser |
|---|---|---|---|---|---|
| Length mm | Conc. %Cr3ι | Temp. K | Mismatch Angle (radians) | Mode | Temp. °K |
| 5 | .05 | 296 | 0 | limiter | 77 |

TABLE II-continued

| Crystal | | Low Intensity Laser-Cavity | | | Ruby Laser |
|---|---|---|---|---|---|
| Length mm | Conc. %Cr3ι | Temp. K | Mismatch Angle (radians) | Mode | Temp. °K |
| | | | .08 | AC gain | |
| | | | .11 | AC gain | |
| | | | .14 | bistable | |
| | | | .18 | bistable | |
| | | | .20 | bistable | |
| 5 | .05 | 120 | 0 | bistable | 77 |
| | | | .04 | bistable | |
| | | | .07 | bistable | |
| | | | .11 | AC gain | |
| | | | .14 | AC gain | |
| | | | .18 | AC gain | |
| 5 | .03 | 105 | 0 | limiter | 77 |
| | | | .12 | bistable | |
| | | | .16 | bistable | |
| | | | .20 | bistable | |
| 3 | .03 | 95 | 0 | limiter | 65 |
| | | | .08 | AC gain | |
| | | | .12 | bistable | |
| | | | .16 | bistable | |
| | | | .20 | bistable | |
| 3 | .03 | 95 | 0 | bistable | 77 |
| | | | .04 | bistable | |
| | | | .08 | bistable | |
| | | | .12 | bistable | |
| | | | .16 | bistable | |
| | | | .20 | bistable | |
| 0.9 | .05 | 85 | 0 | limiter | 77 |
| | | | .04 | clipper | |
| | | | .12 | AC gain | |
| | | | .16 | AC gain | |
| | | | .20 | AC gain | |

Figure 10:
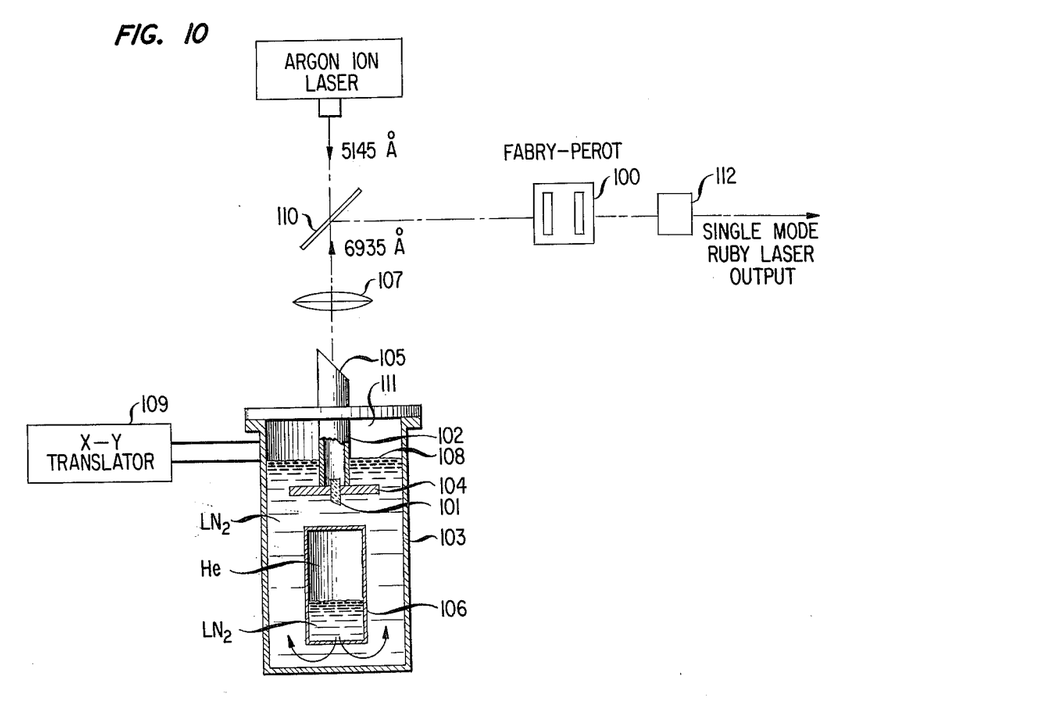
FIG. 10 is a schematic represenation of a ruby laser.

A laser tunable over the absorption width of the $R_1$ line of ruby (0.5 cm$^{-1}$ total width) was required to study the above-described ruby device. Monochromatic cw power of several milliwatts was required. Dye laser efficiencies in the requisite spectral region are low and for this reason, as well as for greater stability, a ruby laser was used. The argon laser-pumped cw ruby laser is shown in FIG. 10.

In contrast to earlier designs the output of this laser is antiparallel to the pump beam. The ruby element 101 has faces which form a wedge of wedge angle 12 seconds ± 2 seconds of arc (exaggerated in the figure). The element is a ¼ inch diameter, 1 cm long, 0.05% $Cr^{3+}$ concentration, 60°, Union Carbide ruby rod with faces flat to λ/10. The upper face of the ruby rod is maintained within a vacuum supported by the chamber 102. The lower face of the ruby rod is maintained at approximately liquid nitrogen temperature by means of the dewar 103. The liquid nitrogen ruby face was coated for 99%+ reflectivity at 5145 Angstroms and 6934 Angstroms. The vacuum ruby face had 50% reflecting at 6934 Angstroms and was 3% reflective at 5145 Angstroms. The rod was held in a 0.255 inch i.d. hole in a Varian CONFLAT flange 104 and epoxied in place using Stycast 1266 epoxy. The flange 104 was mounted on a 1½ inch i.d. evacuated stainless steel tube with a window 105 at the Brewster's angle. A VacIon vacuum pump provided pressures of 10$^{-4}$ Torr and was chosen to avoid oil condensation on the cold ruby face in the vacuum region.

The output frequency of the ruby laser depended on the temperature of the liquid nitrogen in contact with the ruby, which was controlled by pumping on or pressurizing the nitrogen gas 111 above the liquid nitrogen. The pumping and pressurizing means are not shown. To lengthen the filling cycle time of the dewar a helium balloon 106 — a hollow cylinder with an open bottom which was pressurized with gaseous helium — was used allowing the liquid nitrogen level 108 in the dewar to be raised, lowered, or maintained, at will.

The argon laser beam at 5145 Angstroms provided a power of 2 W at the ruby rod. The beam was focused by a 15 cm lens 107 into the ruby laser rod. All of the optics were antireflection coated or at the Brewster's angle. The approximately 300 mW ruby output was a linearly polarized single transverse mode. A collimating lens (not shown) provided a 2.45 mm diameter beam. The output contained a number of longitudinal modes separated by approximately 8.6 GHz, the free spectral range (C/2NL) of the 1 cm long cavity. The modes span a frequency range of more than 60 GHz about the $LN_2$ $PR_1$ line.

Although the laser output had a number of longitudinal modes a single mode could be made to dominate by bringing different parts of the wedged laser rod under the pump beam. For this reason the laser assembly was on an XY translator 109. By pumping or pressurizing the dewar the temperature of the liquid nitrogen, and the ruby element and consequently the frequency of the dominant mode, could be tuned over a 20 GHz range.

A single output frequency was obtained using an external Fabry-Perot interferometer 100 (Burleigh RC 19) to filter the ruby laser output. The output of the ruby laser was directed to the Fabry-Perot by the mirror 110. The Fabray-Perot had 95% reflective coated $\lambda/100$ flat mirrors separated by about 2 mm with a free spectral range of 75 GHz. The Fabry-Perot spacing was controlled by piezoelectric transducers on one of the mirrors. Using a small 400 Hz modulation on the d.c. bias on the transducers, the output of the Fabry-Perot was maintained at a local Fabry-Perot output intensity maximum corresponding to being resonant with any given mode. A standard servotechnique was used for this purpose. There was a 25% transmission loss in the Fabry-Perot due to absorption in the coatings and surface irregularities in the mirrors.

The ruby laser delivered more than 300 mW of power distributed among 7 or 8 different modes. By tuning the ruby wedge, more than 75 mW was obtained in any one of several filtered single modes. By sweeping the Fabry-Perot through a free spectral range and passing the light through a ruby absorber we could see the relative absorption of the different modes directly. The absolute frequency was measured with a high resolution grating spectrometer, but the mode frequencies relative to one another were measured with respect to a helium neon laser using a Fabry-Perot. The helium neon laser line was also used to make sure that the same order of the Fabry-Perot was always being used. An optical isolator 112 was used on the laser output in the optical amplifier configuration of FIG. 9.

Gallium Arsenide (GaAs)

A device capable of operating in either the bistable or amplifying mode may be fabricated using GaAs as the nonlinear medium. In such a device light of approximately $10^4$ cm$^{-1}$ induces transitions which populate excited states with which states there are associated excitons. An exciton is a bound electron hole pair and more generally may be considered as a neutral excited mobile state of a crystal. The energy of the exciton is just below that of the conduction band and hence contributions from this band and from other nondriven states play a significant role in determining the ultimate value of the nonlinear dispersion. In addition, in this system as in semiconductors generally, the change of wave function in the excited state alters the matrix elements which determine dispersion thereby further effecting the dispersive contributions to the amplification phenomenom.

The GaAs device consists of a GaAs medium placed within an optical cavity. The input optical power, intensity, wavelength, dopant cocentration and thickness of the nonlinear medium are adjusted along with other parameters such that the dispersive properties of the medium dominate or are equal to its absorptive properties and combines with the cavity properties to yield either bistability or amplification. Sandwich structures with $GaAl_yAs_{1-y}$ on the outside and $GaAl_xAs_{1-x}$ on the inside may be preferred in order to decrease exciton surface decay.

As in all of the devices described in this application other parameters which affect the dispersive or absorptive properties of the medium — depending on the particular device — may be varied to obtain effective operation. These parameters may be external to the medium such as applied electric, magnetic, gravitational or phonon fields. The variation of such parameters may alter the magnitude or sign of the nonlinear dispersion of the medium or yield a nonlinear dispersion where none existed before.

Other Semiconductors

Other semiconductors may also be used as the nonlinear medium in a device such as that described above. Such semiconductors include but are not limited to InP, GaAsSb, and CdS and will show similar optical characteristics. In addition any semiconductor can be doped with impurities to yield impurity levels. The excitation of such impurity levels will introduce dispersive contributions due to nondriven states including the conduction bands. $N_2$ doped GaP is an example of such a doped semiconductor.

What is claimed is:

1. A method of amplifying variations in an optical signal of a given wavelength comprising:
    introducing light of the given wavelength into a cavity formed by at least two surfaces that reflect light of the given wavelength, and which surfaces are separated at least in part by a positive-temperature nonlinear medium;
    fixing the cavity and medium characteristics such that the dispersive properties of the medium dominate or are equal to the absorptive properties of the medium at the given wavelength and such that there is a single valued relationship between the intensities of the incident and transmitted signals which exhibits gain; and
    extracting the amplified signal from said cavity, the invention characterized in that
    the dispersive properties of the medium are made to dominate its absorptive properties by inducing transitions within the material through the absorption of light, which transitions introduce dispersive contributions due to nondriven states, which contributions are greater than 10 percent of the dispersive contributions due to the driven states.

2. The method of claim 1 where the cavity and medium characteristics are determined by combining the intracavity equations $$\frac{\delta E_F}{\delta Z} = \sigma(o) E_F + \sigma(2K) E_B$$

-continued $$\frac{\delta E_B}{\delta Z} = -\sigma(o) E_B - \sigma(-2K) E_F$$

with the cavity boundary conditions, to yield a single valued input-output characteristic curve that exhibits gain.

3. The method of claim 1 wherein the dispersive contributions due to the nondriven states are greater than 50 percent of the dispersive contributions due to the driven states.

4. The method of claim 1 wherein the dispersive contributions due to the nondriven states dominate the dispersive contributions due to the driven states.

5. The method of claim 1 where the absorptive contributions associated with the driven states dominate the dispersive contributions associated with the driven states.

6. The method of claim 1 wherein one of the driven states is an electronic state.

7. The method of claim 1 where a transition introduced by the absorption of light creates an exciton.

8. The method of claim 1 where at least one of the driven states is an impurity state.

9. The method of claim 7 where the material is selected from the group consisting of InP, GaAs, GaAsSb and CdS.

10. The method of claim 6 where the material is ruby.

11. The method of claim 1 where the cavity is a Fabry-Perot cavity.

12. The method of claim 1 where the light wavelength is greater than 4500 Angstroms and less than or equal to 7500 Angstroms.

13. The method of claim 1 where the light wavelength is greater than 7500 Angstroms and less than or equal to 25 microns.

14. The method of claim 1 where the light wavelength is greater than 500 Angstroms and less than or equal to 4500 Angstroms.

15. The method of claim 1 where the wavelength is such that the medium has a value of $|n_2| > 10^{-13}$ cm$^2$/statvolt$^2$.

16. The method of claim 1 where the medium conditions are fixed by introducing additional light beams into the cavity.

17. The method of claim 1 where the nonlinear medium is a solid.

18. A device to amplify variations in optical signals of a given wavelength comprising
  a cavity formed by at least two surfaces that reflect light of the given wavelength together with means for introducing light into, and extracting light from, the cavity and which surfaces are separated at least in part by a positive-temperature nonlinear medium, which separation is of such a value and which medium is maintained under such conditions, that the dispersive properties of the medium dominate or are equal to the absorptive properties at the given wavelength, and such that there is a single valued relationship between the intensity of the signal of said wavelength impinging on and emitted by the said device that displays gain, the invention characterized in that
  the dispersive properties of the medium are made to dominate its absorptive properties by inducing transitions within the material through the absorption of light, which transitions introduce dispersive contributions due to nondriven states, which contributions are greater than 10 percent of the dispersive contributions due to the driven states.

19. The device of claim 18 where the cavity and medium characteristics are determined by combining the intracavity equations $$\frac{\delta E_F}{\delta Z} = \sigma(o) E_F + \sigma(2K) E_B$$
$$\frac{\delta E_B}{\delta Z} = -\sigma(o) E_B - \sigma(-2K) E_F$$

with the cavity boundary conditions, to yield a single valued input-output characteristic curve that exhibits gain.

20. The device of claim 18 wherein the dispersive contributions due to the nondriven states are greater than 50 percent of the dispersive contributions due to the driven states.

21. The device of claim 18 wherein the dispersive contributions due to the nondriven states dominate the dispersive contributions due to the driven states.

22. The device of claim 18 where the absorptive contributions associated with the driven states dominate the dispersive contributions associated with the driven states.

23. The device of claim 18 where one of the driven states is an electronic state.

24. The device of claim 18 where a transition induced by the absorption of light creates an exciton.

25. The device of claim 18 where at least one of of the driven states is an impurity state.

26. The device of claim 24 where the material is selected from the group consisting of InP, GaAs, GaAsSb and CdS.

27. The device of claim 23 where the material is ruby.

28. The device of claim 18 where the cavity is a Fabry-Perot cavity.

29. The device of claim 18 where the light wavelength is greater than 4500 Angstroms and less than or equal to 7500 Angstroms.

30. The device of claim 18 where the light wavelength is greater than 7500 Angstroms and less than or equal to 25 microns.

31. The device of claim 18 where the light wavelength is greater than 500 Angstroms and less than or equal to 4500 Angstroms.

32. The device of claim 18 where the medium, at the said wavelength, has a value of $|n_2| > 10^{-13}$ cm$^2$/statvolt$^2$.

33. The device of claim 18 where the medium conditions are fixed by introducing additional light beams into the cavity.

34. The device of claim 18 where the nonlinear medium is a solid.

35. A device to treat optical signals of a given wavelength, and whose input-output characteristic curve displays a region of bistability comprising
  a cavity formed by at least two surfaces that reflect light of the given wavelength, together with means for introducing light into, and extracting light from, the cavity, and which cavity is at least partially filled with a positive temperature nonlinear medium of $|n_2| > 10^{-13}$ cm$^2$/statvolt$^2$, which, at the given wavelength, has dispersive properties that dominate or are equal to its absorptive properties, and which medium is maintained under such conditions, that when light of the given wavelength is introduced into the said cavity a bistable relationship exists between the intensity of the signal of said wavelength impinging on, and emitted by, the said device, the invention characterized in that the dispersive properties of the medium are made to dominate its absorptive properties by inducing transitions within the material through the absorption of light, which transitions introduce dispersive contributions due to nondriven states, which contributions are greater than 10 percent of the dispersive contributions due to the driven states.

36. The device of claim 35 where the cavity and medium characteristics are determined by combining the intracavity equations $$\frac{\delta E_F}{\delta Z} = \sigma(o) E_F + \sigma(2K) E_B$$
$$\frac{\delta E_B}{\delta Z} = -\sigma(o) E_B - \sigma(-2K) E_F$$

with the cavity boundary conditions, to yield an input-output characteristic curve with a region of bistability.

37. The device of claim 35 wherein the dispersive contributions due to the nondriven states are greater than 50 percent of the dispersive contributions due to the driven states.

38. The device of claim 35 wherein the dispersive contributions due to the nondriven states dominate the dispersive contributions due to the driven states.

39. The device of claim 35 where the absorptive contributions associated with the driven states dominate the dispersive contributions associated with the driven states.

40. The device of claim 35 where one of the driven states is an electronic state.

41. The device of claim 35 where the transition introduced by the absorption of light creates an exciton.

42. The device of claim 35 where at least one of the driven states is an impurity state.

43. The device of claim 41 where the material is selected from the group consisting of InP, GaAs, GaAsSb and CdS.

44. The device of claim 40 where the material is ruby.

45. The device of claim 35 where the cavity is a Fabry-Perot cavity.

46. The device of claim 35 where the light wavelength is greater than 4500 Angstroms and less than 7500 Angstroms.

47. The device of claim 35 where the light wavelength is greater than 7500 Angstroms and less than 25 microns.

48. The device of claim 35 where the light wavelength is greater than 500 Angstroms and less than 4500 Angstroms.

49. The device of claim 35 where the medium conditions are fixed by introducing additional light beams into the cavity.

50. The device of claim 35 where the medium is a solid.

51. A method of switching an optical signal from one power level to another comprising:
introducing light of the given wavelength into a cavity formed by at least two surfaces that reflect light of the given wavelength, and which surfaces are separated at least in part by a positive temperature nonlinear medium of $|n_2| > 10^{-13}$ cm$^2$/statvolt$^2$ which, at the given wavelength, has dispersive properties that dominate or are equal to its absorptive properties;

fixing the cavity and medium characteristics such that there is a dual valued relationship between the intensities of the incident and transmitted signals, and extracting the switched signal from said cavity; the invention characterized in that the dispersive properties of the medium are made to dominate its absorptive properties by inducing transitions within the material through the absorption of light, which transitions introduce dispersive contributions due to nondriven excited states, which contributions are greater than 10 percent of the dispersive contributions due to the driven states.

52. The method of claim 51 where the cavity and medium characteristics are determined by combining the intracavity equations $$\frac{\delta E_F}{\delta Z} = \sigma(o) E_F + \sigma(2K) E_B$$
$$\frac{\delta E_B}{\delta Z} = -\sigma(o) E_B - \sigma(-2K) E_F$$

with the cavity boundary conditions, to yield a dual valued input-output characteristic curve.

53. The method of claim 51 wherein the dispersive contributions due to the nondriven states are greater than 50 percent of the dispersive contributions due to the driven states.

54. The method of claim 51 wherein the dispersive contributions due to the nondriven states dominate the dispersive contributions due to the driven states.

55. The method of claim 51 where the absorptive contributions associated with the driven states dominate the dispersive contributions associated with the driven states.

56. The method of claim 51 where one of the driven states is an electronic state.

57. The method of claim 51 where the transition introduced by the absorption of light creates an exciton.

58. The method of claim 51 where at least one of the driven states is an impurity state.

59. The method of claim 57 where the material is selected from the group consisting of InP, GaAs, GaAsSb and CdS.

60. The method of claim 56 where the material is ruby.

61. The method of claim 51 where the cavity is a Fabry-Perot cavity.

62. The method of claim 51 where the light wavelength is greater than 4500 Angstroms and less than 7500 Angstroms.

63. The method of claim 51 where the light wavelength is greater than 7500 Angstroms and less than 25 microns.

64. The method of claim 51 where the light wavelength is greater than 500 Angstroms and less than 4500 Angstroms.

65. The method of claim 51 where the medium conditions are fixed by introducing additional light beams into the cavity.

66. The method of claim 51 where the nonlinear medium is a solid.

* * * * *